No. 855,554. PATENTED JUNE 4, 1907.
J. W. AYLSWORTH.
PROCESS FOR MAKING DUPLICATE PHONOGRAPH RECORDS.
APPLICATION FILED MAY 16, 1906. RENEWED APR. 4, 1907.
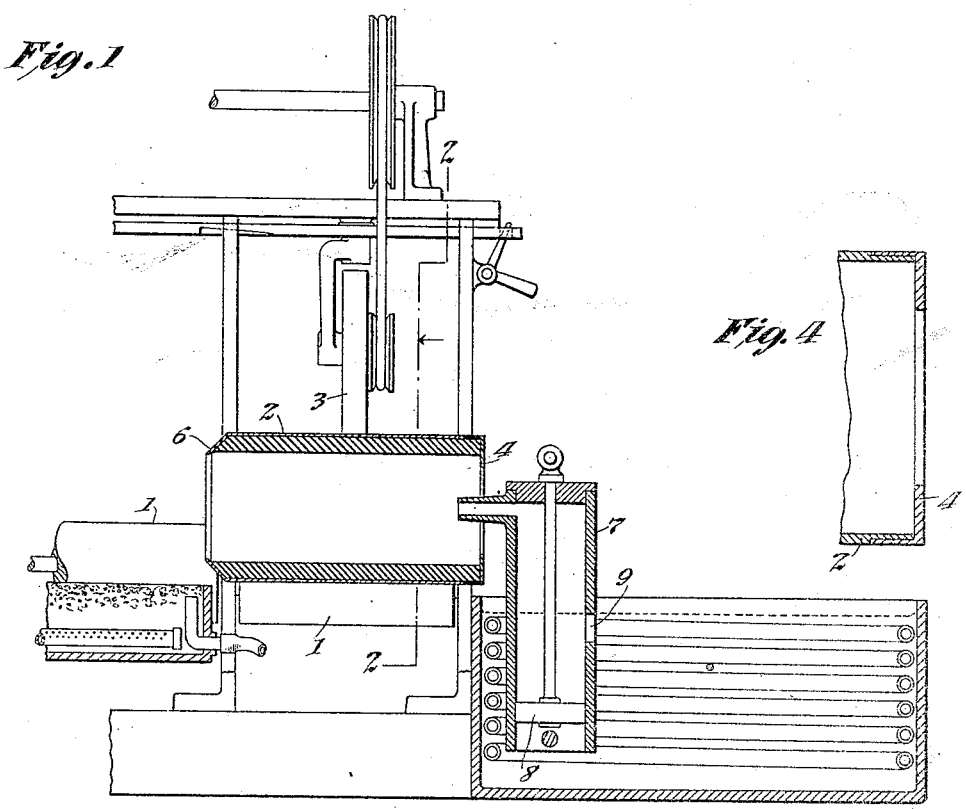
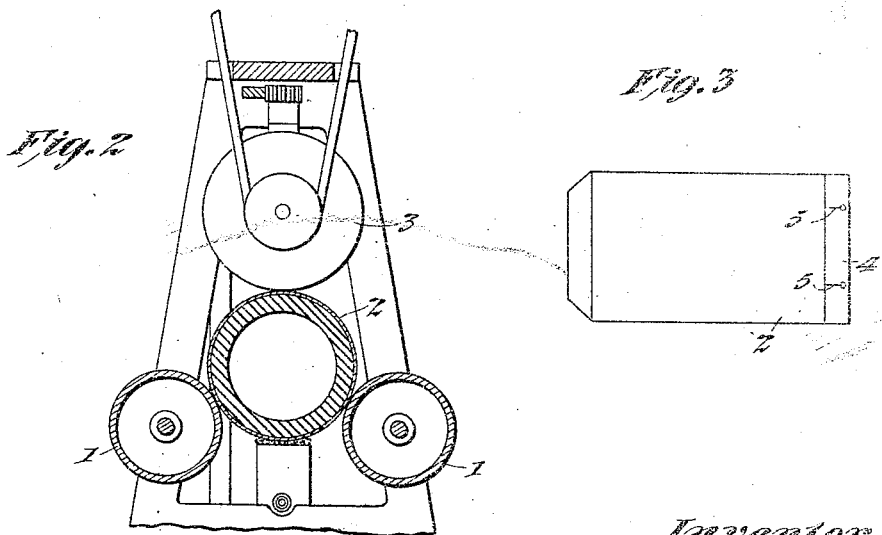
Witnesses:
Frank D. Lewis
Anna R. Klehm
Inventor:
Jonas W. Aylsworth
by Frank L. Dyer
Atty.

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

PROCESS FOR MAKING DUPLICATE PHONOGRAPH-RECORDS.

No. 855,554.  Specification of Letters Patent.  Patented June 4, 1907.

Application filed May 16, 1906. Renewed April 4, 1907. Serial No. 366,429.

*To all whom it may concern:*

Be it known that I, JONAS W. AYLSWORTH, a citizen of the United States, residing at 223 Midland avenue, East Orange, county of Essex, and State of New Jersey, have invented a certain new and useful Process for Making Duplicate Phonograph-Records, of which the following is a description.

In an application for Letters Patent, filed May 11th, 1906, Serial No. 316,250, I describe an improved process and apparatus for making duplicate phonograph records, wherein a heated mold is rotated at a high speed, and molten material is introduced therein, so as to be forcibly distributed uniformly over the bore of the mold by reason of the centrifugal force developed, any air or gas bubbles being forced radially inward so as to make a very perfect molded surface, and the mold being subsequently cooled while still being rotated, so as to set and harden the molten material. In the making of duplicate phonograph records by the process and apparatus described in said application, I contemplate using molds of the type now employed, which are about ¼ of an inch in thickness, and presenting a mass of metal somewhat greater than that contained in the desired duplicate records. Consequently, if it were attempted to make duplicate records from cold molds of this type, the molten material introduced within the mold will be quickly chilled on the record surface, resulting in the formation of air bubbles and preventing the uniform distribution of the material, as takes place when the mold is heated to permit the molten material to maintain its fluid condition while it is being distributed.

My present application relates to an improved process by which duplicate phonograph records can be produced in cold molds, and to this end the invention consists in making use of a mold having very thin walls, and in introducing therein the molten material at a high temperature, whereby the heat imparted to the mold will raise the temperature thereof to or above the melting point of the material, so that the latter will retain its fluid condition and will permit all air and gas bubbles to be driven radially inward as with the process described in my said application.

In order that the invention may be better understood, attention is directed to the accompanying drawing, forming part of this specification, and in which—

Figure 1, is a longitudinal sectional view through a part of an apparatus similar to that disclosed in said application, showing a single mold, and means for introducing charges of molten material therein, Fig. 2, a section on the line 2—2 of Fig. 1, Fig. 3, a side elevation of the mold, and Fig. 4, an enlarged detail view of the end of the mold.

In all of the above views, corresponding parts are represented by the same numerals of reference.

1—1 represent idlers to support the mold 2, the latter being rotated by a driving roller 3. The mold 2 is shown as being provided with very thin walls, say—about $\frac{1}{16}$ of an inch in thickness, so as to present a body of minimum heat absorbing capacity commensurate with the desired strength and rigidity. The movable end plate 4, is flanged and fits tightly over the open end of the mold, the elasticity of the flange being provided by slitting the same at 5—5, as shown. The permanent flange 6, is of the usual form and is provided with the desired engraved matter for identifying the record, as will be understood. Any suitable means may be employed for introducing charges of molten material into the mold, as for example, a pump 7, the plunger 8 of which is adapted to be moved below an opening 9, to which is supplied the molten material. This material may be of any suitable composition, as for example, either the special wax-like materials disclosed in my patents, No. 676,111 of June 11th, 1901, or No. 782,375 of February 14th, 1905. The temperature at which the molten material is heated in carrying the process into effect depends, obviously, upon the character of the material and upon the heat absorbing capacity of the mold, but with a mold having walls $\frac{1}{16}$ of an inch in thickness, the maintaining of the material at a temperature of 100° F. above its melting point when introduced into the mold will be amply sufficient for the purpose. The important consideration is that there shall be sufficient bulk of molten material heated to a sufficiently high temperature, as in comparison with the heat absorbing capacity of the mold, to raise the temperature of the mold to or above the melting point of the material, before heat is absorbed from the material sufficiently to lower its temperature to the congealing point, so that the material will retain its fluid condition while it is being distributed over the bore of the mold, and will permit air and gas bubbles to be forced radially inward, as I described in my said application. After the material has been thus distributed uniformly around the interior of the mold, the latter may be forcibly and rapidly cooled in any suitable way, such as by the application of cooling pads for the same, as I describe in said application. When the material has been thus solidified the finished duplicate record, after it has contracted away from the mold, may be removed therefrom, and its bore suitably finished, if necessary.

Having now described my invention, what I claim as new and desire to secure by Letters Patent is as follows:—

1. The process of making duplicate phonograph records, which consists in rapidly rotating a thin tubular mold, and in introducing therein a charge of very hot molten material, whereby the temperature of the mold will be raised to or above the melting point of the material, substantially as set forth.

2. The process of making duplicate phonograph records, which consists in rapidly rotating a thin tubular mold, and in introducing therein a charge of very hot molten material, exceeding the mold in bulk, and presenting sufficient excess heating capacity to raise the temperature of the mold to or above the melting point of the material, substantially as set forth.

This specification signed and witnessed this 14th day of May, 1906.

JONAS W. AYLSWORTH.

Witnesses:
FRANK L. DYER,
ANNA R. KLEHM.